United States Patent

Argent et al.

Patent Number: 6,126,440
Date of Patent: Oct. 3, 2000

[54] SYNTHETIC AIR ASSEMBLY FOR OXY-FUEL FIRED FURNACES

[75] Inventors: Ronald D. Argent, Graysville; Christopher J. Hoyle, Houston; Gordon Dickinson, Eighty-Four, all of Pa.; Trevor Ward, Hemsley North; George R. Mattocks, Kidderminister, both of United Kingdom

[73] Assignee: Frazier-Simplex, Inc., Washington, Pa.

[21] Appl. No.: 08/853,573

[22] Filed: May 9, 1997

Related U.S. Application Data

[60] Provisional application No. 60/019,071, May 9, 1996.

[51] Int. Cl.[7] .................................................... F27D 17/00
[52] U.S. Cl. ........................... 432/181; 432/180; 110/347
[58] Field of Search ................................ 432/59, 72, 179, 432/180, 181; 65/134.4; 110/345, 347

[56] References Cited

U.S. PATENT DOCUMENTS

| | | | |
|---|---|---|---|
| 3,699,903 | 10/1972 | King | 110/1 J |
| 3,760,776 | 9/1973 | Durrant | 122/459 |
| 3,905,745 | 9/1975 | Konda | 431/2 |
| 3,957,418 | 5/1976 | Sata | 431/9 |
| 3,969,892 | 7/1976 | Stettler et al. | 60/39.51 R |
| 3,982,879 | 9/1976 | Pfefferle | 431/10 |
| 3,985,505 | 10/1976 | Bredeweg | 23/230 PC |
| 4,030,874 | 6/1977 | Vollerin | 431/9 |
| 4,512,267 | 4/1985 | Cegielski, Jr. et al. | 110/347 |
| 4,659,305 | 4/1987 | Nelson et al. | 431/9 |
| 4,699,071 | 10/1987 | Vier et al. | 110/345 |
| 4,721,454 | 1/1988 | Schirmer et al. | 431/10 |
| 4,926,765 | 5/1990 | Dreizler et al. | 110/234 |
| 4,995,807 | 2/1991 | Rampley et al. | 431/9 |
| 5,040,470 | 8/1991 | Lofton et al. | 110/234 |
| 5,129,818 | 7/1992 | Balsiger | 431/4 |
| 5,145,354 | 9/1992 | Palm, Jr. | 431/1 |
| 5,179,903 | 1/1993 | Abboud et al. | 110/345 |
| 5,180,300 | 1/1993 | Hovis et al. | 431/115 |
| 5,186,901 | 2/1993 | Bayer et al. | 110/345 |
| 5,203,859 | 4/1993 | Khinkis et al. | 432/180 |
| 5,241,916 | 9/1993 | Martin | 110/348 |
| 5,275,554 | 1/1994 | Faulkner | 431/115 |
| 5,402,739 | 4/1995 | Abboud et al. | 110/346 |
| 5,632,795 | 5/1997 | Brown et al. | 65/134.4 |

*Primary Examiner*—Philip H. Leung
*Assistant Examiner*—Gregory A. Wilson
*Attorney, Agent, or Firm*—Webb Ziesenheim Logsdon Orkin & Hanson, P.C.

[57] ABSTRACT

A method and assembly is provided for modifying a regenerative or a recuperative furnace system having air-fuel burners for use with synthetic air. A portion of the exhaust gases from the furnace is recycled and mixed with oxygen gas to form synthetic air. The synthetic air is then used to support combustion in the furnace. A cassette regenerative oxy-fuel cross-fired furnace system is also provided. The cassette regenerative furnace system utilizes synthetic air containing a mixture of recycled exhaust gases and oxygen in combination with cassette regenerators.

13 Claims, 5 Drawing Sheets

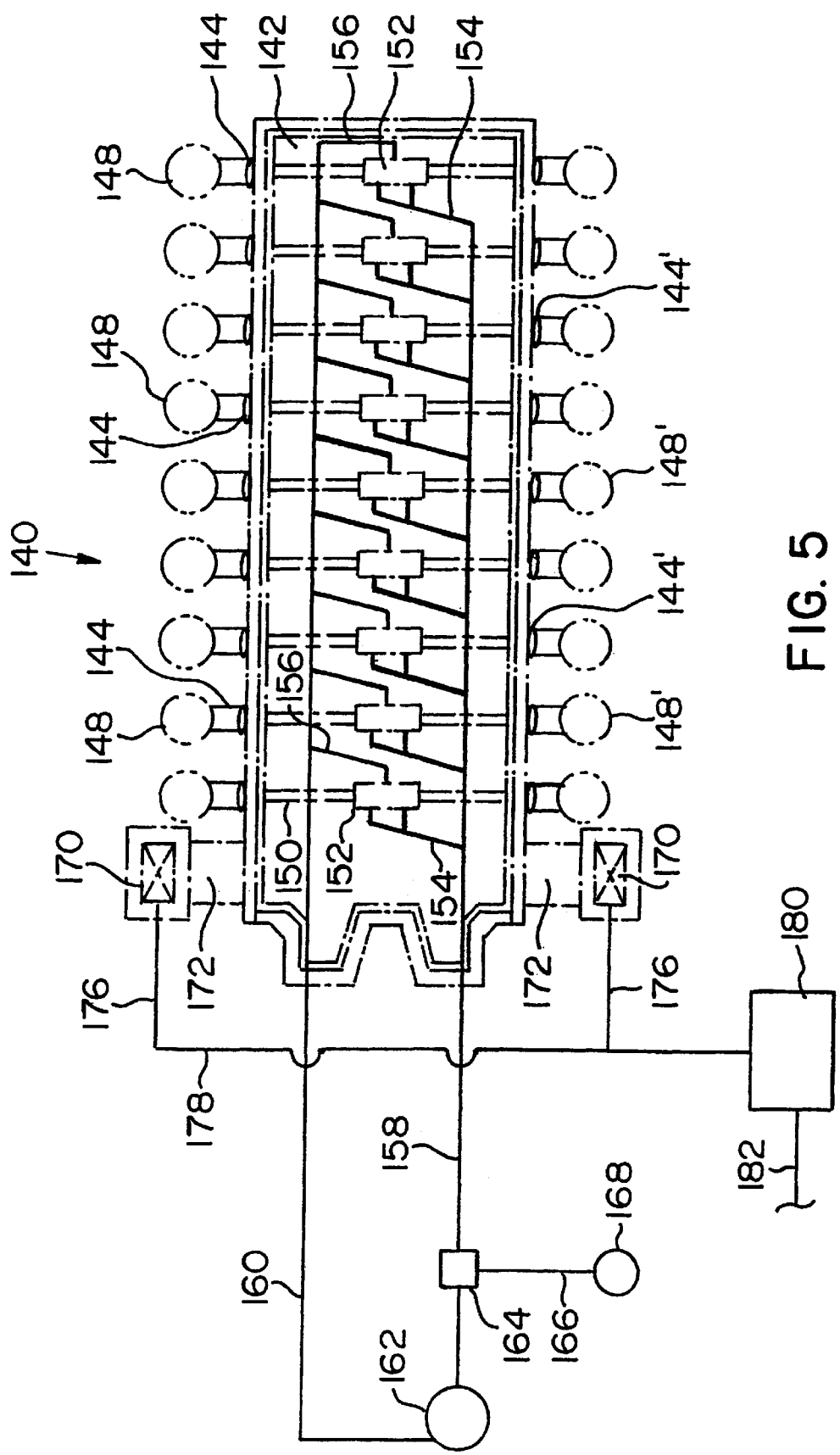

SYNTHETIC AIR ASSEMBLY FOR OXY-FUEL FIRED FURNACES

CROSS REFERENCE TO RELATED APPLICATION

This application claims the benefits of Provisional Application Serial No. 60/019,071 filed May 9, 1996.

BACKGROUND OF THE INVENTION

1. Field of the Invention

The invention relates generally to the reduction of oxides of nitrogen ($NO_x$) in the exhaust gases of furnaces and, more particularly, to an apparatus and method for utilizing a portion of the exhaust gases from a glass melting furnace to form a substantially nitrogen free synthetic air mixture to support combustion in the furnace.

2. Description of the Prior Art

Most commercial glass is produced in high temperature air/fuel furnaces where solid raw materials are melted, reacted to form stabilized silicates and degassed of entrained gases to allow downstream forming of a homogeneous product. Energy input to the furnace in the form of natural gas or oil firing and electrical resistance heating (electric boosting) melts the raw materials, provides heat of reaction and raises the molten temperature while decreasing viscosity to allow for proper degassing of the glass. The vast majority of these furnaces use air to support combustion. Different furnace designs have evolved in each segment of the glass industry which are specifically tailored to the particular demands of the end use product. Examples of traditional furnace designs include the regenerative melter, recuperative melter, all-electric melter and direct fired unit melter.

By far, the dominant furnace design for the glass industry is the regenerative melter. A typical regenerative melter includes at least two burners, two regenerators, a flow reversal system and associated controls. Paired sets of burners are located on opposed sides of the furnace or are end port fired where both systems are on the same wall of the furnace. A heat regenerator communicates with each burner. One system utilizes burners and regenerators that are closely coupled by a length of refractory lined duct to suit the space available on site. Other systems utilize separate burners which are located within an exhaust port. When the first burner of a pair fires, using combustion air fed to the base of its regenerator, the second burner of the pair acts as an exhaust port drawing off waste gas or the more conventional design permits the waste gases to enter an exhaust port, thereby heating the regenerator for the second burner or combustion port. When this heated regenerator is sufficiently charged, the reversal system operates to reverse the firing system. The second burner of the pair fires to heat the furnace and the first burner, in time, acts as an exhaust port, or there is an exhaust port where the burner is incorporated as a stand-alone burner. The combustion air is then directed through the hot regenerator of the second burner or port to preheat the combustion air prior to combustion. After a period of time, the flow of exhaust gases and combustion air through the regenerators is again reversed to maintain heating of the combustion air.

These regenerators typically take the form of latticed brick work or "checkers" through which the combustion air passes on its way to the burner or port to preheat the combustion air and through which the exhaust gases from the furnace pass on their way to the stack. The exhaust gases transfer their sensible heat to the regenerator bricks as they pass through. On the reverse cycle, clean combustion air brought in at ambient temperature is passed through the previously heated regenerator of the firing burner and thus picks up sensible heat from the bricks. In this way, the regenerator preheats the air prior to combustion.

In an alternative traditional furnace design, recuperative heat exchangers, rather than regenerators, are used to preheat the combustion air. Recuperative heat exchangers differ from regenerative heat exchangers in that the exhaust gases and combustion air flow through different piping systems and do not mix. The recuperator acts as a simple indirect heat exchanger. Heat from the exhaust gases flowing through one conduit is transferred to combustion air flowing through another conduit.

A problem with these known air/fuel furnaces is that due to the use of atmospheric air as the combustion gas, $NO_x$ compounds are produced during combustion. Government environmental regulations strictly limit the amount of $NO_x$ compounds which may be discharged into the atmosphere, thereby requiring costly clean-up to be done on the furnace exhaust gases prior to discharge into the atmosphere.

As an alternative to conventional air/fuel furnaces, oxy-fuel fired furnaces have been developed. In an oxy-fuel fired furnace, pure oxygen gas instead of air is introduced into the furnace to support combustion. The use of pure oxygen rather than air eliminates the $NO_x$ problem generally associated with air/fuel systems. However, unlike conventional air/fuel furnaces, the oxygen is typically not preheated prior to being mixed with the fuel and no flow reversal systems are used. The exhaust gas is simply directed to an exhaust stack. No regenerators or recuperators are generally associated with oxy-fuel fired furnaces.

Oxy-fuel fired furnaces clearly offer some advantages over typical air/fuel furnaces, such as generally lower $NO_x$ concentrations. However, oxy-fuel furnaces also have some strong disadvantages. Oxy-fuel furnaces, as a general rule, are more expensive to operate since the oxygen must be purchased for use in the furnace. Further, oxy-fuel furnaces are typically not as thermally efficient as regenerative or recuperative furnaces. Additionally, special burner nozzles are required for oxy-fuel fired furnaces since the oxy-fuel system burns at a much higher temperature than conventional regenerative or recuperative furnace systems. Therefore, for many glass manufacturers, the higher costs required to switch from a regenerative or recuperative system to a conventional oxy-fuel system outweigh the benefits derived from the conversion.

In an effort to reduce the emission of $NO_x$ in air/fuel systems, furnace systems have been developed in which a portion of $NO_x$ containing stock gas is recycled, in admixture with cold fresh air, back into the combustion chamber of the furnace. U.S. Pat. No. 4,699,071 is an example of such a system. U.S. Pat. Nos. 3,760,776; 4,926,765; 4,995,807; and 5,040,470 are also examples of combustion systems in which a portion of the flue gas is recirculated to support combustion. However, such recirculation systems suffer from stable combustion problems and also do not totally eliminate the emission of $NO_x$ from the discharged air. Additionally, these systems do not fully utilize the benefits of a heat recovery system to increase the operating efficiency of the systems.

U.S. Pat. No. 3,905,745 to Konda discloses a method and apparatus for preventing the formation of harmful constituents in exhaust gases, including $NO_x$, through a mixture of recirculated combustion gases and oxygen. However, in the Konda patent, little concern is given to the recovery of waste heat and the additional energy savings that can be realized by such waste heat recovery.

Therefore, it is an object of the invention to provide a method and assembly for cost-effectively retrofitting existing regenerative and recuperative furnace systems to use a "synthetic air" comprising a mixture of exhaust gases and oxygen as a combustion gas source while maintaining the benefits of waste heat recovery. It is also an object of the invention to provide a cassette regenerative oxy-fuel furnace system which utilizes a synthetic air mixture of exhaust gases and oxygen which substantially eliminates the discharge of $NO_x$ into the atmosphere as well as reducing the particulate emissions.

SUMMARY OF THE INVENTION

A method and assembly is provided for modifying a regenerative or a recuperative furnace system having air-fuel burners for use with synthetic air. A portion of the exhaust gases from the furnace is recycled and is mixed with oxygen to form a synthetic air mixture. The synthetic air mixture is then used to support combustion in the furnace.

A cassette regenerative oxy-fuel cross-fired furnace system is also provided. The cassette regenerative furnace system utilizes synthetic air comprising a mixture of recycled exhaust gases and oxygen gas in combination with cassette regenerators.

A complete understanding of the invention will be obtained from the following description when taken in connection with the accompanying drawing figures wherein like reference characters identify like parts throughout.

BRIEF DESCRIPTION OF THE DRAWINGS

FIG. 5 is a plan view of a cassette regenerative oxy-fuel cross-fired furnace system of the invention that incorporates other waste heat opportunities.

DESCRIPTION OF THE PREFERRED EMBODIMENTS

Figure 1:
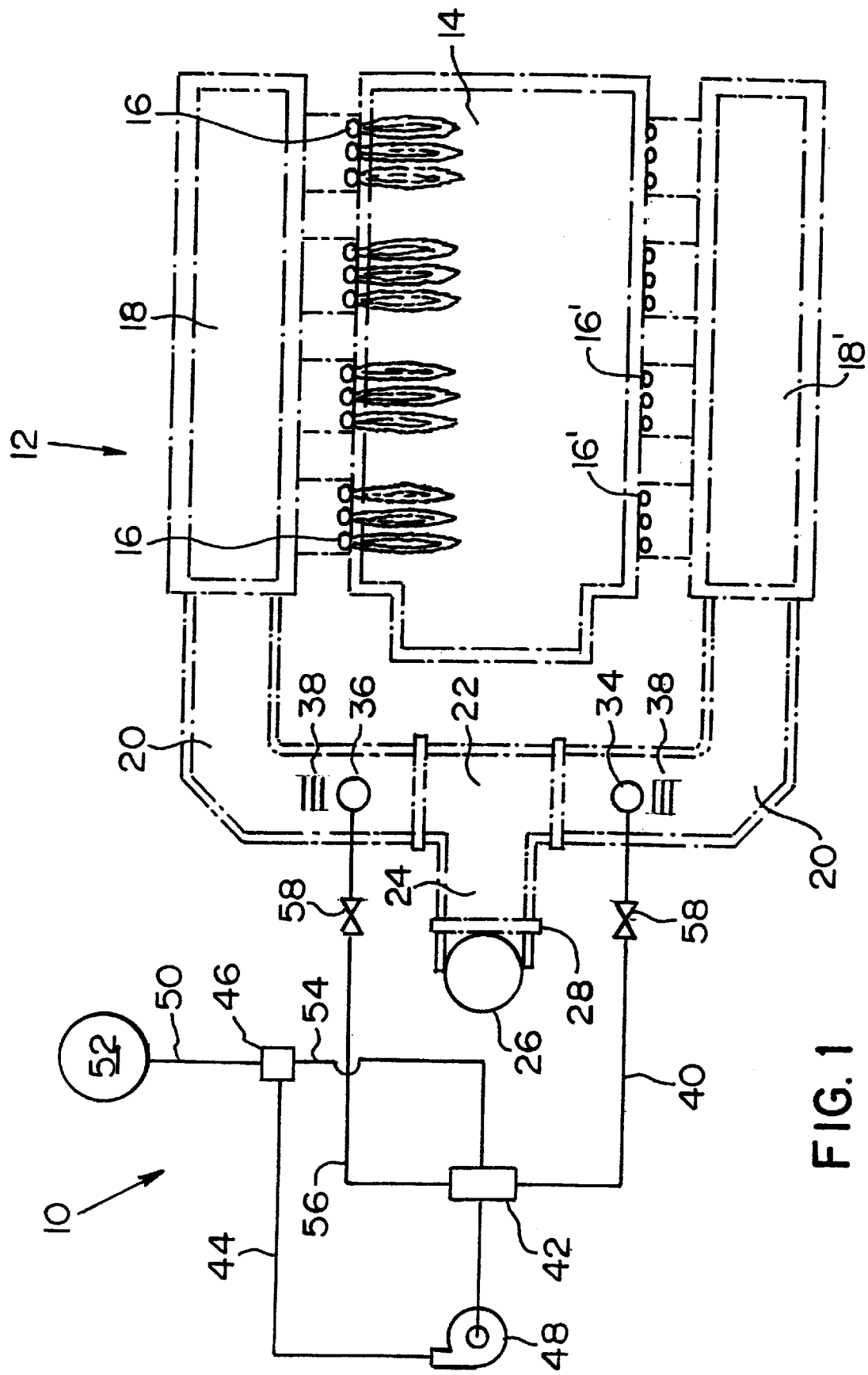
FIG. 1 is a plan view of a cross-fired regenerative furnace connected to a synthetic air assembly of the invention.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Also, as used herein, the term "synthetic air" means a mixture of oxygen gas and recycled exhaust gas.

Figure 2:
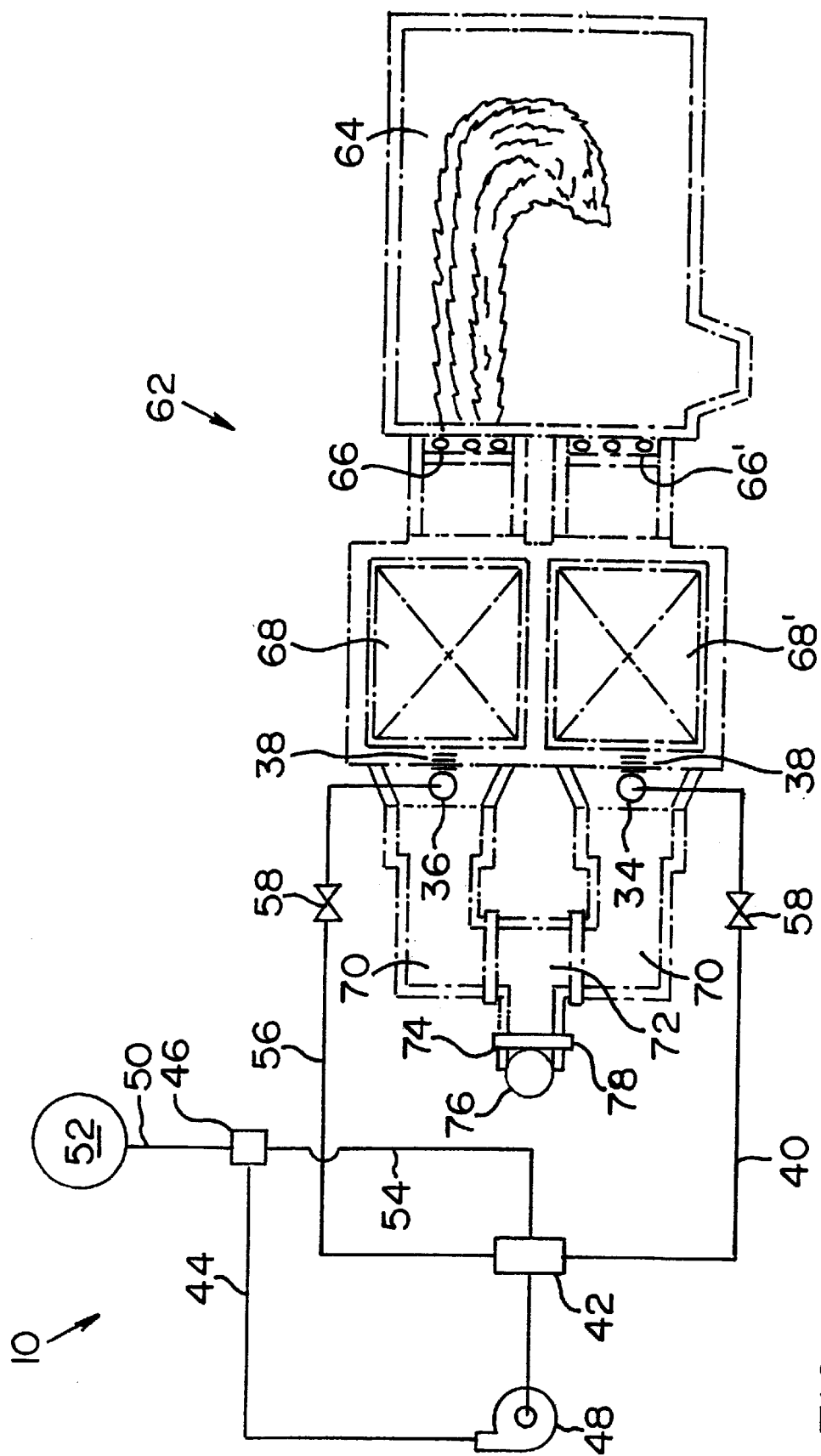
FIG. 2 is a plan view of the synthetic air assembly of FIG. 1 attached to an end-fired regenerative furnace.

A synthetic air assembly for a regenerative furnace system is generally designated 10 in FIGS. 1 and 2 of the drawings. FIG. 1 of the drawings shows the assembly 10 connected to a conventional cross-fired regenerative furnace system 12. The cross-fired regenerative furnace system 12 includes a furnace 14 having opposed sets of burners 16, 16', with each set of burners 16, 16' having an associated regenerator 18, 18'. The regenerators 18, 18' are in flow communication with a flue passageway 20 having a first reversal valve 22 to reverse the flow of combustion air and exhaust gases from one set of burners 16, 16' to the other set of burners 16, 16'. The first reversal valve 22 is in flow communication with an exhaust conduit 24 leading to an exhaust stack 26. A pressure control damper 28 is generally located in the exhaust conduit 24. The specific structure and operation of such a conventional cross-fired regenerative furnace system 12 is well known to those of ordinary skill in the art and therefore will not be discussed in detail herein.

The synthetic air assembly 10 is connected to the furnace system 12 via a first by-pass opening 34 and a second by-pass opening 36 formed in the flue passageway 20 of the furnace system 12. The first and second by-pass openings 34 and 36 are located in the flue passageway 20 on either side of the first reversal valve 22. A flow diversion assembly 38, such as a conventional baffle assembly, may be added to the flow passageway 20 adjacent each by-pass opening 34 and 36.

A first conduit 40 extends between the first by-pass opening 34 and a second reversal valve 42. A second conduit 44 extends between the second reversal valve 42 and a mixing assembly 46. A recirculation fan 48 is located in the second conduit 44. An oxygen conduit 50 extends between an oxygen source 52 and the mixing assembly 46. A third conduit 54 extends between the mixing assembly 46 and the second reversal valve 42. A fourth conduit 56 extends between the second reversal valve 42 and the second by-pass opening 36. Isolation valves 58 may be located in the first conduit 40 and fourth conduit 56 to isolate the synthetic air assembly 10 from the furnace system 12, as discussed hereinbelow.

FIG. 2 of the drawings shows the synthetic air assembly 10 of FIG. 1 attached to a conventional end-fired regenerative furnace system 62. The structure and operation of such an end-fired regenerative furnace system is well known to one of ordinary skill in the art. Such a regenerative furnace system 62 includes a furnace 64 having two sets of burners 66, 66' located along a wall at one end of the furnace 64. Each set of burners 66, 66' is in flow communication with an associated regenerator 68, 68' and a flue passageway 70. A first reversal valve 72 is located in the flue passageway 70. An exhaust conduit 74 extends between the first reversal valve 72 and an exhaust stack 76. A pressure control damper 78 is located in the exhaust conduit 74. The structure of the synthetic air assembly 10 shown in FIG. 2 of the drawings for the end-fired regenerative furnace system 62 is the same as that shown in FIG. 1 of the drawings for the cross-fired regenerative furnace system 12. The synthetic air assembly 10 is connected to the furnace system 62 shown in FIG. 2 of the drawings via first and second by-pass openings 34 and 36 formed in the flue passageway 70 on opposite sides of the first reversal valve 72.

Figure 3:
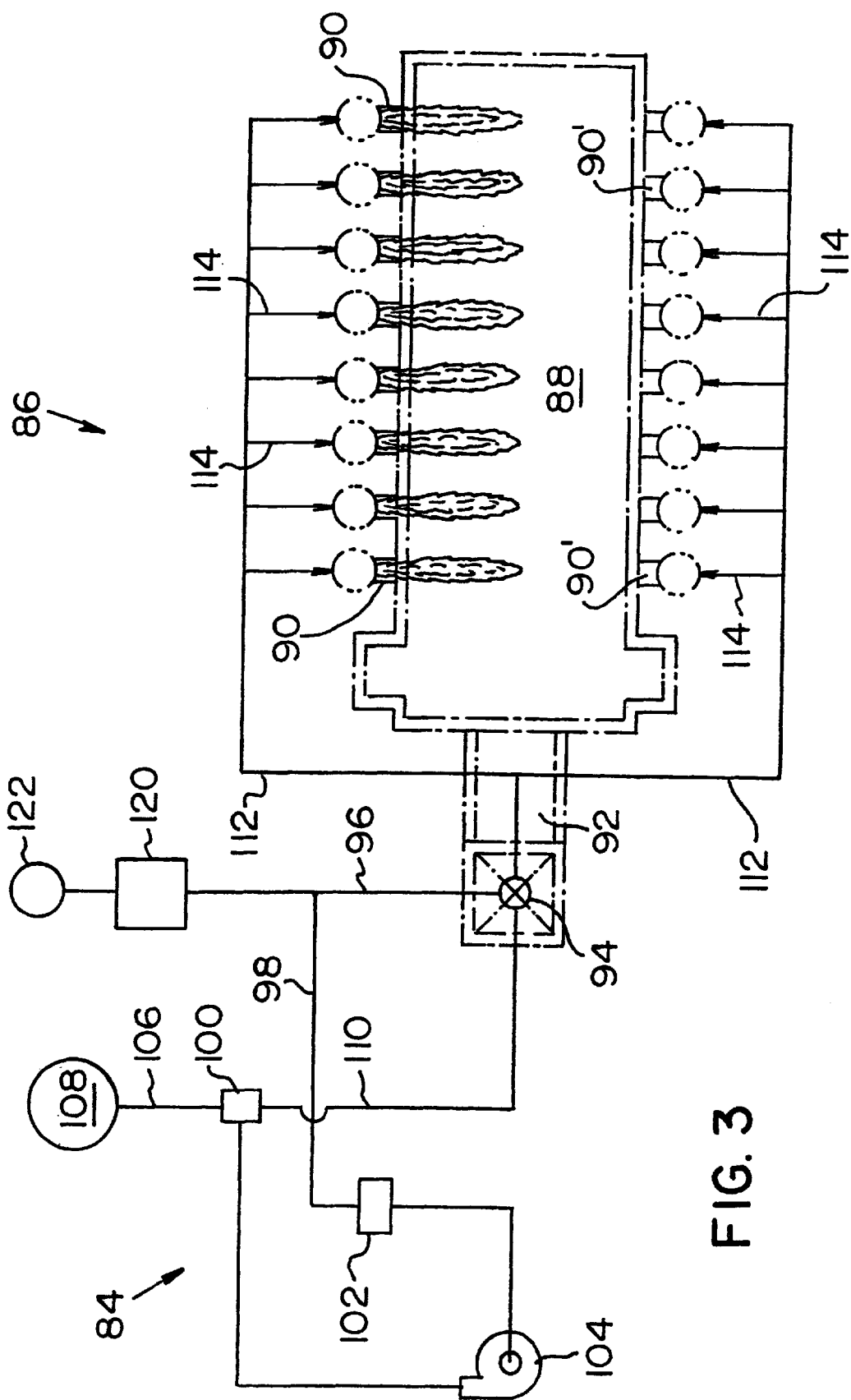
FIG. 3 is a plan view of a second embodiment of the synthetic air assembly of the invention connected to a cross-fired recuperative furnace.
Figure 4:
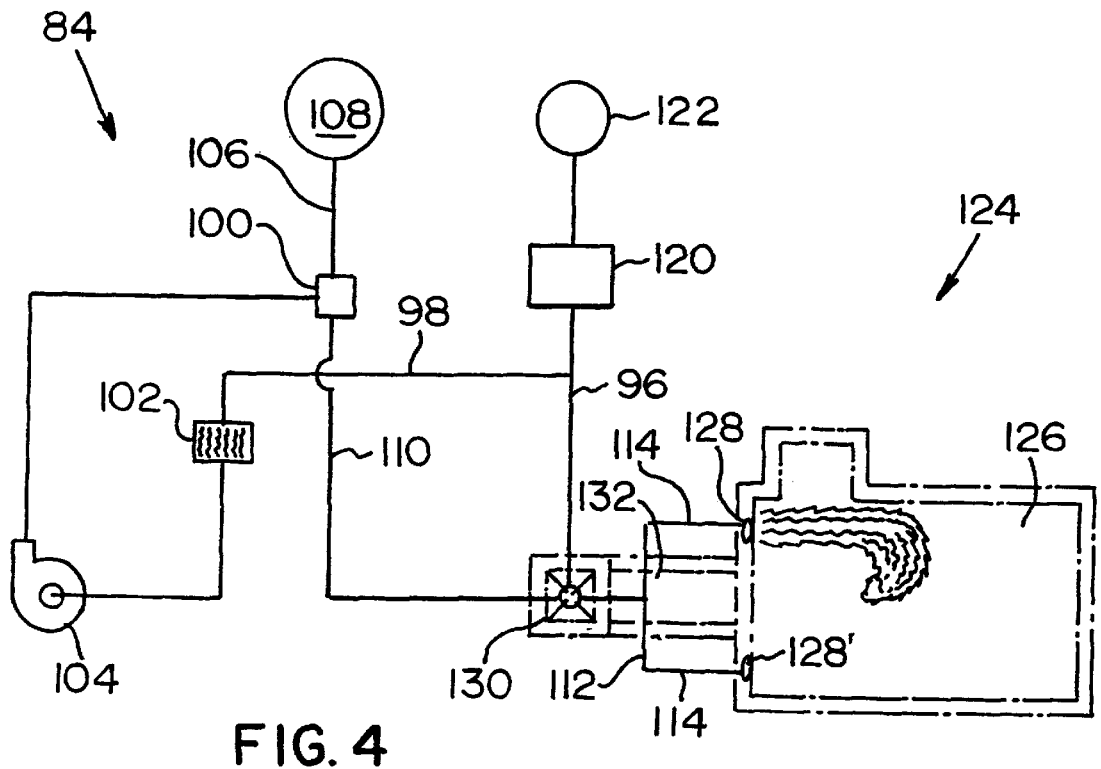
FIG. 4 is a plan view of the synthetic air assembly of FIG. 3 attached to an end-fired recuperative furnace.

A synthetic air assembly for recuperator equipped furnace systems is generally designated 84 in FIGS. 3 and 4 of the drawings. Looking at FIG. 3 of the drawings, the synthetic air assembly 84 is shown attached to a conventional cross-fired oxy-fuel recuperative furnace system 86. The cross-fired recuperative furnace system 86 includes a furnace 88 having opposed sets of burners 90, 90' located along the sides of the furnace 88. A flue passageway 92 extends between the furnace 88 and a recuperator 94. The recuperator 94 includes a separate exhaust gas passage and combustion air passage typically formed by separate piping systems. The structure and operation of a conventional cross-fired recuperative furnace system 86 is well known to those of ordinary skill in the art and therefore a detailed discussion of this structure will not be given.

The synthetic air assembly 84 includes a first conduit 96 in flow communication with the exhaust gas passage of the recuperator 94. A second conduit 98 extends between the first conduit 96 and a mixing assembly 100. A cooling assembly 102, such as a conventional water spray cooler, and a recirculation fan 104 are in flow communication with the second conduit 98. An oxygen conduit 106 extends between the mixing assembly 100 and an oxygen source 108. A third conduit 110 extends between the mixing assembly 100 and the combustion air passage of the recuperator 94.

The combustion air passage of the recuperator 94 is in flow communication with a combustion air header 112 of the recuperator furnace system 86. Combustion air conduits 114 extend between the combustion air header and the burners 90, 90'.

A secondary regeneration assembly 120 may be located in the first conduit 96 between the recuperator 94 and an exhaust stack 122. The secondary regeneration assembly 120 preferably includes at least one cassette regenerator in flow communication with the first conduit 96. An example of such a cassette regenerator is manufactured by Engineered Combustion Systems, Inc. of Bridgeville, Pa. (model nos. RCB20/26-RCB100/120). The cassette regenerator is lined with refractory bricks and contains heat absorbing filter media such as a plurality of tabular alumina balls of about ¾" in diameter. The alumina balls recover sensible heat rapidly from the exhaust gas passing through the first conduit 96 and also filter out particulate matter from the exhaust gas before it enters the exhaust stack 122. The cassette regenerator is mounted on wheels and is preferably connected to the first conduit 96 by quick release fittings. This permits quick and easy replacement of the cassette regenerator when the filter media becomes dirty.

The heat stored in the alumina balls of the cassette regenerator can be used, for example, to preheat/reform fuel gas before the fuel gas is sent to the burners 90. Additionally, the exhaust gases in the first conduit 96 can be used for other purposes, such as cullet preheating, steam formation, etc. The structure and use of cassette regenerators is discussed in more detail in International Application No. PCT/US97/01053 designating, inter alia the United States, the disclosure of which is hereby incorporated by reference herein.

FIG. 4 of the drawings shows the synthetic air assembly 84 connected to a conventional end-fired recuperative furnace system 124. The furnace system 124 includes a furnace 126 having two sets of burners 128, 128' located along a wall at one end of the furnace 126. The burners 128, 128' are in flow communication with a recuperator 130 in conventional manner, such as a flue passageway 132. The synthetic air assembly 84 is in flow communication with the recuperator 130 in the same manner as described above with respect to the discussion of FIG. 3 of the drawings. The components of the synthetic air assembly 84 in FIGS. 3 and 4 of the drawings are identical and therefore are designated by the same reference numbers.

Figure 6:
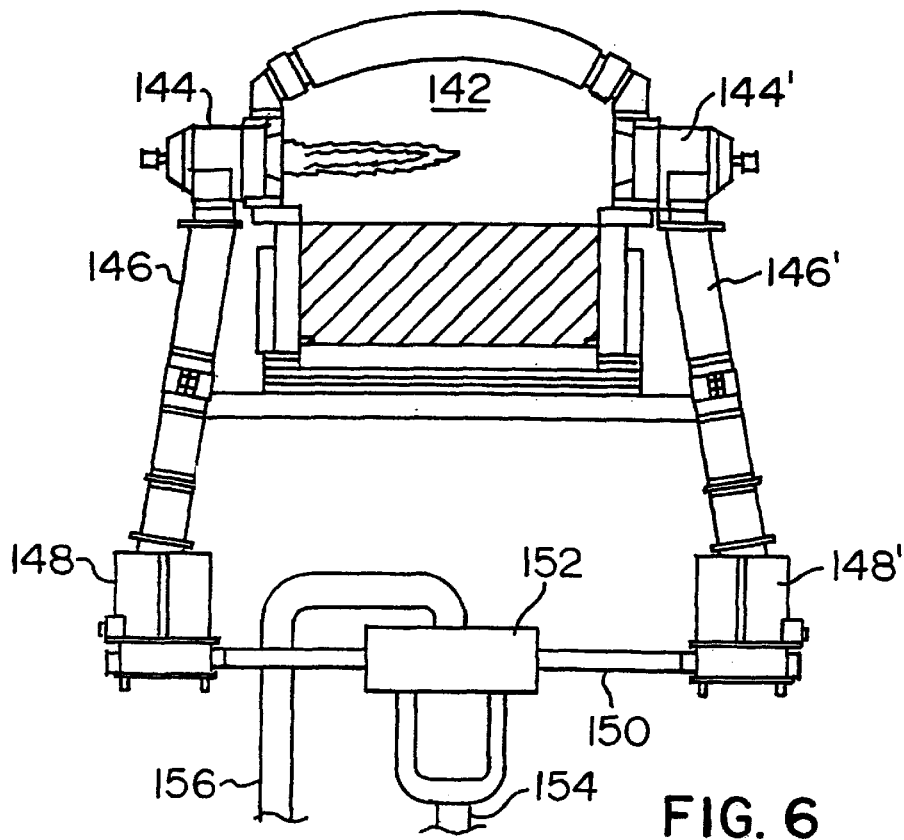
FIG. 6 is an end, sectional view of the cassette regenerative oxy-fuel cross-fired furnace system shown in FIG. 5.

A cassette regenerative oxy-fuel cross-fired furnace system of the invention is generally designated 140 in FIGS. 5 and 6 of the drawings. The furnace system 140 includes a furnace 142 having a series of opposed burners 144, 144'. As shown particularly in FIG. 6 of the drawings, each burner 144, 144' has an associated burner conduit 146, 146' extending between the burner 144, 144' and an associated cassette regenerator 148, 148'.

A regenerator conduit 150 extends between the opposed cassette regenerators 148, 148'. A reversal valve 152, such as a five-way spool valve reversal valve, is located in the regenerator conduit 150. The reversal valve 152 is in flow communication with a combustion air conduit 154 and an exhaust gas conduit 156. As shown in FIG. 6 of the drawings, the combustion air conduit 154 is in flow communication with a combustion air header 158 and the exhaust gas conduit 156 is in flow communication with an exhaust gas header 160. A recirculation fan 162 is in flow communication with both the exhaust gas header 160 and the combustion air header 158.

A mixing assembly 164 is located in the exhaust gas header 160 and an oxygen conduit 166 extends between the mixing assembly 164 and an oxygen source 168. A pair of exhaust stacks 170 are in flow communication with the furnace 142 via flue passageways 172. A secondary exhaust conduit 176 extends between each exhaust stack 170 and a secondary regenerator header 178. A secondary regeneration assembly 180 is in flow communication with the secondary regenerator header 178 and a waste gas conduit 182. The secondary regeneration assembly 180 preferably includes at least one cassette regenerator.

Operation and use of the devices shown in FIGS. 1–6 of the drawings will now be described.

Looking first at FIG. 1 of the drawings, a conventional cross-fired regenerative furnace system 12 can be easily modified or retrofitted with the synthetic air assembly 10 of the invention to allow the regenerative furnace system 12 to use an oxygen rich "synthetic air" as combustion air for the furnace 14. The synthetic air is created by recirculating a portion of the exhaust gases, primarily containing $CO_2$ and $H_2O$, and adding oxygen to this recirculated portion of the exhaust gases. The oxygen addition is incorporated to the extent necessary to satisfy the correct stoichiometric conditions for combustion.

To retrofit the regenerative furnace system 12, the first and second by-pass openings 34 and 36 are made in the flue passageway 20 on opposite sides of the first reversal valve 22. The flow diversion assemblies 38 are then mounted on the inside of the flue passageway 20 adjacent each by-pass opening 34 and 36. The furnace system 12 is now ready to be connected with the synthetic air assembly 10.

The first conduit 40 of the synthetic air assembly 10 is placed in flow communication with the first by-pass opening 34 and the fourth conduit 56 of the synthetic air assembly 10 is placed in flow communication with the second by-pass opening 36. This can be done by any conventional means, such as by welding or by threaded couplings. To utilize the synthetic air assembly 10, the regenerative furnace system 12 is started in conventional manner, such as by supplying fresh combustion air to the burners 16, 16'. For purposes of explanation, the upper burners 16 as shown in FIG. 1 are shown as the initial firing burners and the lower burners 16' are acting as the exhaust burners. Fuel and the fresh combustion air are supplied to the burners 16 and the fuel and combustion air mixture ignited. The exhaust from the combustion process flows through the lower burners 16' and the associated regenerator 18' to the flue passageway 20.

The start up and operation of a conventional cross-fired regenerative furnace is well known to one of ordinary skill in the art and will not be discussed in detail herein. However, after the initial start up of the regenerative furnace system 12, the synthetic air assembly 10 of the invention may be used to allow the replacement of the nitrogen containing combustion air with an oxygen rich synthetic air. To use the synthetic air assembly 10, the isolation valves 58 are opened and the recirculation fan 48 started. A first portion of the exhaust gases flowing through the flue passageway 20 from the regenerator 18' is pulled through the first by-pass opening 34 and into the first conduit 40 by the recirculation fan 48. The amount of exhaust gases drawn into the first conduit 40 can be controlled in conventional manner, such as by the rotation speed of the recirculation fan 48 and by the diversion assembly 38. The amount of the first exhaust gas portion drawn into the first conduit 40 is preferably between about 65–80% of the exhaust gas volume flowing past the first by-pass opening 34 in the flue passageway 20.

The first exhaust gas portion is drawn through the first conduit 40 and into the second reversal valve 42 where is it directed into the second conduit 44. The first exhaust gas portion flows through the second conduit 44 to the mixing assembly 46 where pure oxygen gas is added to the first exhaust gas portion to form a synthetic air mix of about 65–80 volume percent exhaust gas and about 20–35 volume percent oxygen. The mixing assembly 46 can be of conventional type, such as a venturi injector system or a high temperature fan system. In a venturi injector system, the oxygen is used to produce a jet that entrains a metered flow of exhaust gas into the coned-intake venturi. With the high temperature fan system, a metered flow of oxygen is mixed with a metered flow of the exhaust gas to form the synthetic air.

The synthetic air flows through the third conduit 54 back to the second reversal valve 42 where it is directed into the fourth conduit 56. The synthetic air flows through the fourth conduit 56, into the second by-pass opening 36 and into the flue passageway 20 where it is directed to the regenerator 18 of the firing burners 16. The outside combustion air source used to initially start the regenerative furnace may be closed and thereafter the synthetic air is used as the combustion air for the furnace system 12. Since no atmospheric air is then being introduced into the furnace 14, minimal nitrogen is present during combustion. The $NO_x$ initially present at start-up is purged over a period of time by natural dilution. Alternatively, the initial $NO_x$ formation can be minimized by starting the furnace system 12 using a $CO_2$ or steam supply as a carrier gas.

The second portion of the exhaust gas which does not flow through the first by-pass opening 34 flows through the first reversal valve 22 of the furnace system 12 and through the exhaust conduit 24 to the exhaust stack 26. The second exhaust gas portion constitutes about 20–35 volume percent of the exhaust gas discharged into the flue passageway 20 by the combustion occurring in the furnace 14.

After a specified time, the first reversal valve 22 and second reversal valve 42 are shifted to-reverse the flow of synthetic air and exhaust gas through the furnace system 12. The lower burners 16' of FIG. 1 now become the firing burners. Exhaust gases generated in the furnace are then directed through the upper burners 16 and associated regenerator 18 into the flue passageway 20 and the second by-pass opening 36. The exhaust gases now flow through the fourth conduit 56 into the second reversal valve 42 and through the second conduit 44 to the mixing assembly 46 where oxygen gas is added to the exhaust gas to form the synthetic air. The synthetic air travels through the third conduit 54, into the second reversal valve 42, through the first conduit 40 and into the first by-pass opening 34 to the flue passageway 20 and lower regenerator 18' to support combustion at the lower burners 16'. As the synthetic air passes through the hot regenerator 18, the synthetic air is preheated prior to combustion. The portion of the exhaust gas not flowing through the second by-pass opening 36 flows through the first reversal valve 22, the exhaust conduit 24 and then out the exhaust stack 26. The second reversal valve 42 operates on the same time cycle as the first reversal valve 22.

As will be understood by one of ordinary skill in the art, by closing the isolation valves 58 and restarting the flow of combustion air to the furnace 14, the furnace system 12 can easily be shifted back to conventional operation should there be a problem, such as a loss of oxygen supply, with the synthetic air assembly 10.

Apart from the obvious benefits of oxy-fuel firing, i.e., $NO_x$ elimination, etc., the synthetic air assembly 10 of the invention alters the balance of economics in such a way that utilizing oxygen as a part of the combustion system with a waste heat recovery arrangement provides savings to glass manufacturers regardless of the type of glass being produced. Retrofitting the synthetic air assembly 10 onto an existing regenerative furnace system 12 enables glass to be melted using an oxy-fuel system without complex and expensive changes to the existing furnace system. Additionally, the benefits of a regenerative system, such as waste heat recovery, are maintained. Further, in a natural air system, the mass ratio of oxygen to nitrogen is fixed and, therefore, the theoretical flame temperature of a given fuel depends on the fuel chemistry and the combustion air preheat temperature. With the synthetic air assembly of the invention, the oxygen mass ratio can be adjusted to provide additional control of flame temperature and flame length. However, it is preferred that a "standard synthetic air mix" be used. The term "standard synthetic air mix" is defined for purposes herein as the addition of oxygen to the exhaust gas in an amount required for the combustion of a given quantity and type of fuel so that it provides the same thermal load on the ensuing flame as the nitrogen content of the equivalent natural air supply. Additionally, the synthetic air assembly 10 of the invention does not require the use of specialized burners normally associated with oxy-fuel systems. Further, since the principal heat transfer mechanism for regenerators (as well as recuperators discussed hereinbelow) is radiation, the composition of the synthetic air produced in the synthetic air assembly 10 greatly improves the thermal efficiency of the air side heat transfer. The heat transfer coefficient between waste gases and refractory is about 3–4 times that of refractory to air. This is due to the presence of carbon dioxide and water vapor in the waste gas. Since the synthetic air produced in the invention contains a significant amount of carbon dioxide and water vapor, the air side heat transfer coefficient will greatly improve, leading to higher preheating temperatures. Such higher preheating temperatures will improve melting efficiency.

Furthermore, the radiation heat transfer potential of a flame produced using the synthetic air instead of natural air for combustion is greatly increased because a similarly sized flame will only contain strongly radiative gases ($CO_2$ plus $H_2O$) whereas the natural air flame contains only one third of ($CO_2$ plus $H_2O$) gases and two thirds of a weakly radiative nitrogen gas. An additional benefit is that the reduced waste gas volume from a synthetic air installation can generally be diluted and cleaned by conventional bag filters at a relatively lower cost compared to the conventional use of electrostatic precipitators.

The overall benefits from the use of the synthetic air assembly 10 of the invention include exceptionally low $NO_x$ exhaust stream, improved regenerator efficiency, reduced exhaust gas volume and improved heat transfer by radiation from the flames. These benefits lead to a high thermal efficiency for the modified furnace system and also lead to a greatly reduced volume of exhaust waste gas at a temperature that can be reduced to allow low cost gas cleaning equipment to be used.

FIG. 2 of the drawings shows the synthetic air assembly 10 attached to an end-fired regenerative furnace system 62. The installation and operation of the synthetic air assembly 10 with the furnace system 62 shown in FIG. 3 of the drawings is the same as that described above with respect to the cross-fired furnace system 12 shown in FIG. 2 of the drawings.

Installation and operation of the synthetic air assembly 84 shown in FIGS. 3 and 4 of the drawings will now be described. With respect to FIG. 3 of the drawings, the cross-fired recuperative furnace system 86 is of conventional type well known in the art. In cross-fired recuperative furnaces, it is common to have the burners on both sides of the furnace firing at the same time. Therefore, no reversal valve system is generally present in the recuperative furnace systems. To connect the synthetic air assembly 84 to the furnace system 86, the first conduit 96 is connected to the exhaust gas passage of the recuperator 94 and the third conduit 110 is connected to the combustion air passage of the recuperator 94. After conventionally starting the furnace system 86, the exhaust gases from the furnace 88 flow through the flue passageway 92 and into the exhaust gas passage of the recuperator 94. The exhaust gases flow from the recuperator 94 into the first conduit 96. A first portion of the exhaust gases are drawn out of the first conduit 96 and into the second conduit 98 by the recirculation fan 104. The first exhaust gas portion drawn into the second conduit 98 is preferably between about 65–80 volume percent of the exhaust gases flowing through the first conduit 96. Because recuperator systems work with much higher exhaust temperatures than regenerator systems, the exhaust gases are directed through the cooler 102 before entering the recirculation fan 104 and being directed to the mixing assembly 100.

Oxygen is mixed with the first exhaust gas portion in the mixing assembly 100 to form synthetic air, as described above. The synthetic air flows through the third conduit 110 and into the combustion gas passage of the recuperator 94. The synthetic air is preheated in the recuperator 94 by the counter flow of the hot exhaust gas. The preheated synthetic air flows from the recuperator 94, into the combustion air header 112 and then into the separate combustion air conduits 114 to support combustion at the burners 144.

The second exhaust gas portion not drawn into the second conduit 98 flows through the first conduit 96 and into the exhaust stack 122. As shown in FIG. 3 of the drawings, a secondary regeneration assembly 120, preferably including at least one cassette regenerator, can be placed in flow communication with the second exhaust gas portion flowing through the first conduit 96. The heat recovered by this secondary regeneration assembly 120 can be used to reform the fuel gas to heat the fuel gas prior to being sent to the burners 90. Alternatively, the exhaust gas flowing through the first conduit 96 can be used for other useful purposes, such as cullet preheating, steam production, etc. Additionally, to allow the furnace system 86 to be switched between conventional operation and use of the synthetic air assembly 84, conventional isolation or by-pass valving can be placed in the existing piping of the furnace system 86 or into the first and third conduits 96 and 100 to switch the furnace system between conventional and synthetic air operation.

FIG. 4 of the drawings shows the synthetic air assembly 84 connected to a conventional end-fired recuperative furnace system 124. The installation and operation of the synthetic air assembly 84 is the same as that described above with respect to the cross-fired recuperator furnace system 86 shown in FIG. 3 of the drawings.

Retrofitting an existing recuperative furnace system with the synthetic air assembly 84 of the invention provides the same benefits as discussed above with respect to the synthetic air assembly 10 used with a regenerative furnace system.

While the above discussion focused primarily on retrofitting existing furnace systems with the synthetic air assemblies 10 and 84, it is to be understood that these synthetic air assemblies could also be employed as original components on a new furnace system.

Operation of the cassette regenerative oxy-fuel cross-fired furnace system 140 shown in FIGS. 5 and 6 of the drawings will now be described. The general operation of the cross-fired furnace system 140 shown in FIG. 5 of the drawings is similar to that of the cross-fired furnace system 12 described above with respect to FIG. 1 of the drawings. However, the furnace system 140 has been modified for use with a cassette regenerator system.

As shown in FIG. 6 of the drawings, the burners 144 on one side, for example the left side as shown in FIG. 6, of the furnace system 140 fire into the furnace 142. Hot products of combustion exhaust into the non-firing burners 144' on the right side of FIG. 6, through the associated burner conduit 146' and into the cassette regenerator 148' for the non-firing burner 144'. The exhaust gas flowing through the cassette regenerator 148' heats the filter media and then flows through the regenerator conduit 150 to the reversal valve 152. The reversal valve 152 directs the exhaust gas to the exhaust gas conduit 156 and into the exhaust gas header 160.

Combustion air flows from the combustion air conduit 154, into the reversal valve 152 where it is directed to the cassette regenerator 148 on the left side of FIG. 6. The combustion air is preheated by the filter media in the cassette regenerator 148 in similar manner to being preheated by a conventional regenerator and flows through the burner conduit 146 into the firing burner 144 on the left side of FIG. 6 to support combustion. After a specified time cycle, the reversal valve 152 switches to reverse the flow of combustion air from the left side of FIG. 6 to the right side of FIG. 6. The burner 144' on the right side of FIG. 6 then becomes the firing burner and the burner 144 on the left side of FIG. 6 becomes the exhaust burner.

As shown in FIG. 5 of the drawings, the exhaust gas from the exhaust gas conduits 156 of the cassette regeneration pairs is drawn into the exhaust gas header 160 by the recirculation fan 162. The speed of the fan 162 is controlled such that a first exhaust gas portion of approximately 65–80% of the total exhaust gas volume generated in the furnace 142 flows into the exhaust gas header 156. oxygen gas is mixed with the exhaust gas in the exhaust gas header 156 at the mixing assembly 100 in similar manner as described above to produce synthetic air. The synthetic air flows through the recirculation fan 162 and into the combustion air header 158 where it is directed to the individual combustion air conduits 154 of the reversal valves 152 where it is further directed to the firing burners to support combustion.

Not all of the exhaust gases in the furnace 142 flow into the burner conduits 146, 146' as described above. Approximately, 20–35 volume percent of the exhaust gases flow into the exhaust stacks 170 of the furnace system. This second exhaust gas portion can be directed into the secondary exhaust conduits 176 in conventional manner, such as by a fan or baffle system, into the secondary regenerator header 178 and to the secondary regeneration assembly 180 for use in reforming the fuel gas, as described above with respect to the discussion of FIG. 3 of the drawings.

The cassette furnace system 140 of the invention has an advantage over the conventional recuperative or regenerative furnace arrangements discussed above in that the cassette regenerators 148, 148' act as a filter, enabling the glass maker to capture 80–95% of particulates and condensates from the exhaust stream. This captured material is readily removed by means of an on-line cleaning arrangement or by removal and replacement of used cassette regenerators 148, 148' in the system. The captured material can be reused in the melt process. This aspect of the invention combined with the use of the synthetic air of the invention creates not only an exceptionally efficient melting system but also provides a highly cost-effective way to meet governmental emission regulations without the use of specialized equipment, such as electrostatic precipitators and de-$NO_x$ equipment.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A method of modifying a regenerative furnace system having a flue passageway and air/fuel burners for use with synthetic air, comprising the steps of:
   forming a first by-pass opening and a second by-pass opening in the flue passageway;
   dividing exhaust gases from the furnace system into a first exhaust gas portion and a second exhaust gas portion;
   directing the first exhaust gas portion through the first by-pass opening into a synthetic air assembly;
   mixing oxygen with the first exhaust gas portion to form synthetic air; and
   directing the synthetic air through the second by-pass opening to support combustion at the furnace system burners.

2. The method as claimed in claim 1, wherein the furnace system includes a first reversal valve and the method includes the steps of directing the second exhaust gas portion through the first reversal valve of the furnace system to an exhaust conduit.

3. The method as claimed in claim 1, wherein the synthetic air assembly includes a second reversal valve and the method includes:
   directing the first exhaust gas portion through the second reversal valve to a mixing assembly; and
   mixing the oxygen with the first exhaust gas portion in the mixing assembly to form the synthetic air.

4. The method as claimed in claim 1, wherein the furnace system has a first reversal valve in flow communication with the flue passageway and the synthetic air assembly includes a second reversal valve and a mixing assembly, the method including:
   constructing the first by-pass opening in the flue passageway on one side of the first reversal valve;
   constructing the second by-pass opening in the flue passageway on the other side of the first reversal valve;
   directing the first exhaust gas portion through the first by-pass opening to the second reversal valve;
   directing the first exhaust gas portion from the second reversal valve to the mixing assembly;
   adding oxygen to the first exhaust gas portion at the mixing assembly to form the synthetic air;
   directing the synthetic air from the mixing assembly to the second reversal valve;
   directing the synthetic air from the second reversal valve through the second by-pass opening into the flue passageway; and
   directing the synthetic air to the burners of the furnace assembly to support combustion.

5. The method as claimed in claim 4, including directing the second exhaust gas portion in the flue passageway to the first reversal valve; and
   directing the second exhaust gas portion from the first reversal valve to an exhaust conduit.

6. The method as claimed in claim 1, including controlling the flow of exhaust gas through the first by-pass opening such that the first exhaust gas portion is about 65–80 volume percent of the exhaust gas volume in the flue passageway.

7. The method as claimed in claim 1, including controlling the addition of oxygen to the first exhaust gas portion such that the amount of oxygen added is about 100% of a stoichiometric oxygen requirement to support combustion at the burners.

8. The method as claimed in claim 1, including controlling the addition of oxygen to the first exhaust gas portion such that the oxygen is about 20–35 volume percent of the synthetic air.

9. A synthetic air assembly for a regenerative furnace system having a first reversal valve and a flue passageway, comprising:
   a first by-pass opening in the flue passageway;
   a second by-pass opening in the flue passageway;
   a second reversal valve in flow communication with the first and second by-pass openings;
   a mixing assembly in flow communication with the second reversal valve; and
   an oxygen source in flow communication with the mixing assembly.

10. The assembly as claimed in claim 9, including a recirculation fan in flow communication with the second reversal valve.

11. The assembly as claimed in claim 9, including at least one diversion assembly located in the flue passageway adjacent at least one of the first and second by-pass openings.

12. The assembly as claimed in claim 9, including means for isolating the synthetic air assembly from the regenerative furnace system.

13. A synthetic air assembly for a regenerative furnace system having a first reversal valve and a flue passageway, the assembly comprising:
   a first by-pass opening in the flue passageway;
   a second reversal valve;
   a first conduit extending between the first by-pass opening and the second reversal valve;
   a first isolation valve located in the first conduit;
   a mixing assembly;
   a second conduit extending between the second reversal valve and the mixing assembly;
   an oxygen source;
   an oxygen conduit extending between the oxygen source and the mixing assembly;
   a third conduit extending between the mixing assembly and the second reversal valve;
   a second by-pass opening in the flue passageway;
   a fourth conduit extending between the second reversal valve and the second by-pass opening; and
   a second isolation valve located in the fourth conduit.

* * * * *

UNITED STATES PATENT AND TRADEMARK OFFICE
CERTIFICATE OF CORRECTION

PATENT NO : 6,126,440
DATED : October 3, 2000
INVENTOR(S) : Ronald D. Argent et al.

It is certified that error appears in the above-identified patent and that said Letters Patent is hereby corrected as shown below:

Column 7 Line 55, "to-reverse" should read --to reverse--.

Column 10 Line 50 "oxygen" should read --Oxygen--.

Signed and Sealed this

Twenty-second Day of May, 2001

*Attest:*

NICHOLAS P. GODICI

*Attesting Officer*     Acting Director of the United States Patent and Trademark Office